Figure 1:
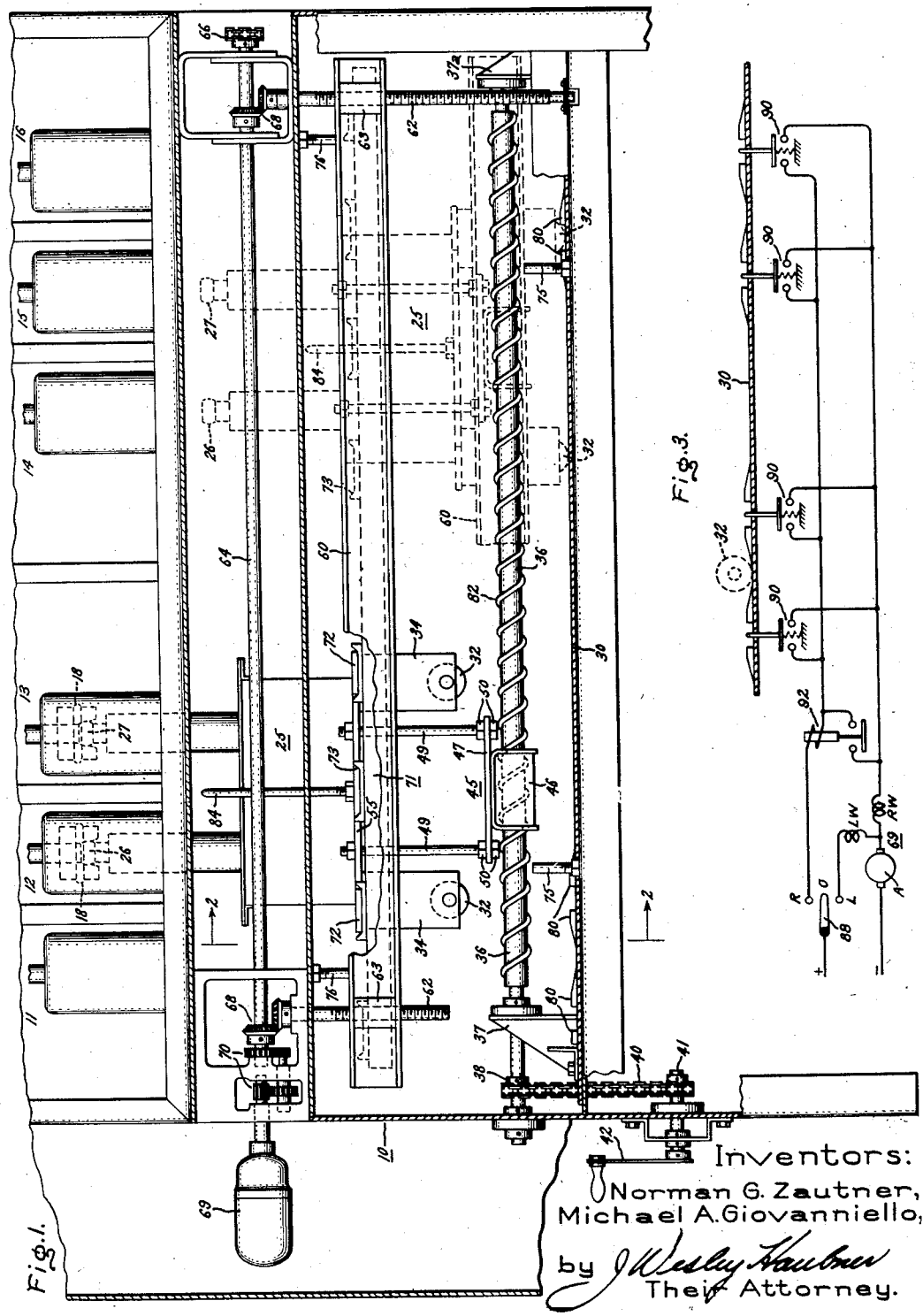

March 11, 1958  N. G. ZAUTNER ET AL  2,826,722
ELECTRIC SWITCHGEAR
Filed Feb. 14, 1955  2 Sheets-Sheet 1

Inventors:
Norman G. Zautner,
Michael A. Giovanniello,
by J. Wesley Haubner
Their Attorney.

March 11, 1958 N. G. ZAUTNER ET AL 2,826,722
ELECTRIC SWITCHGEAR
Filed Feb. 14, 1955 2 Sheets-Sheet 2

Inventors:
Norman G. Zautner,
Michael A. Giovanniello,
by J. Wesley Hautner
Their Attorney.

United States Patent Office 2,826,722
Patented Mar. 11, 1958

2,826,722

ELECTRIC SWITCHGEAR

Norman G. Zautner, Lansdowne, and Michael A. Giovanniello, Philadelphia, Pa., assignors to General Electric Company, a corporation of New York Application February 14, 1955, Serial No. 488,074

13 Claims. (Cl. 317—103)

This invention relates to electric switchgear and, more particularly, to electric switchgear of the type wherein a single circuit breaker, or switchgear unit, is utilized for selectively controlling any one of a plurality of different electric circuits.

Frequently, it is desirable to utilize only a single circuit breaker, or switchgear unit, for selectively controlling any one of a plurality of different electric circuits. This, of course, requires that the switchgear unit be shifted about between connected positions in the different circuits. Heretofore, this shifting action has been performed by the use of mechanisms which were unduly complicated. Additionally, these mechanisms have required considerable skillfully-directed effort on the part of an attendant in order to effect the desired shifting action.

Accordingly, it is an object of our invention to provide a simple and reliable mechanism for shifting a switchgear unit between a plurality of different selected circuit-controlling positions.

Another object is to provide a mechanism of the above type which requires only a minor amount of skill and effort on the part of an attendant in order to perform the desired shifting of the switchgear unit.

Another object is to provide a simple positioning means which not only precisely locates the switchgear unit in a preselected position but also provides the attendant with a positive indication of this condition.

In accordance with one form of our invention, we provide a stationary framework having a plurality of sets of horizontally-spaced stationary contacts mounted thereon and a movable switchgear unit having a set of contacts for selectively mating with any one set of said stationary contacts. For translating the switchgear unit into any one of a plurality of horizontally-spaced positions wherein its contacts vertically align with a selected set of stationary contacts, we provide a carriage which is operatively mounted on a lead screw. The switchgear unit is coupled to this carriage by guide means which permits relative movement therebetween only in a vertical direction. For lifting the switchgear unit into contact-mating relationship once it has been translated into a selected one of said horizontally-spaced positions, we provide a pair of lifting brackets which extend horizontally beneath the switchgear unit. These brackets are horizontally-immovable with respect to the stationary framework and are adjustably mounted on the stationary framework by means which is operable to produce simultaneous elevation of the brackets together with the switchgear unit.

Figure 2:
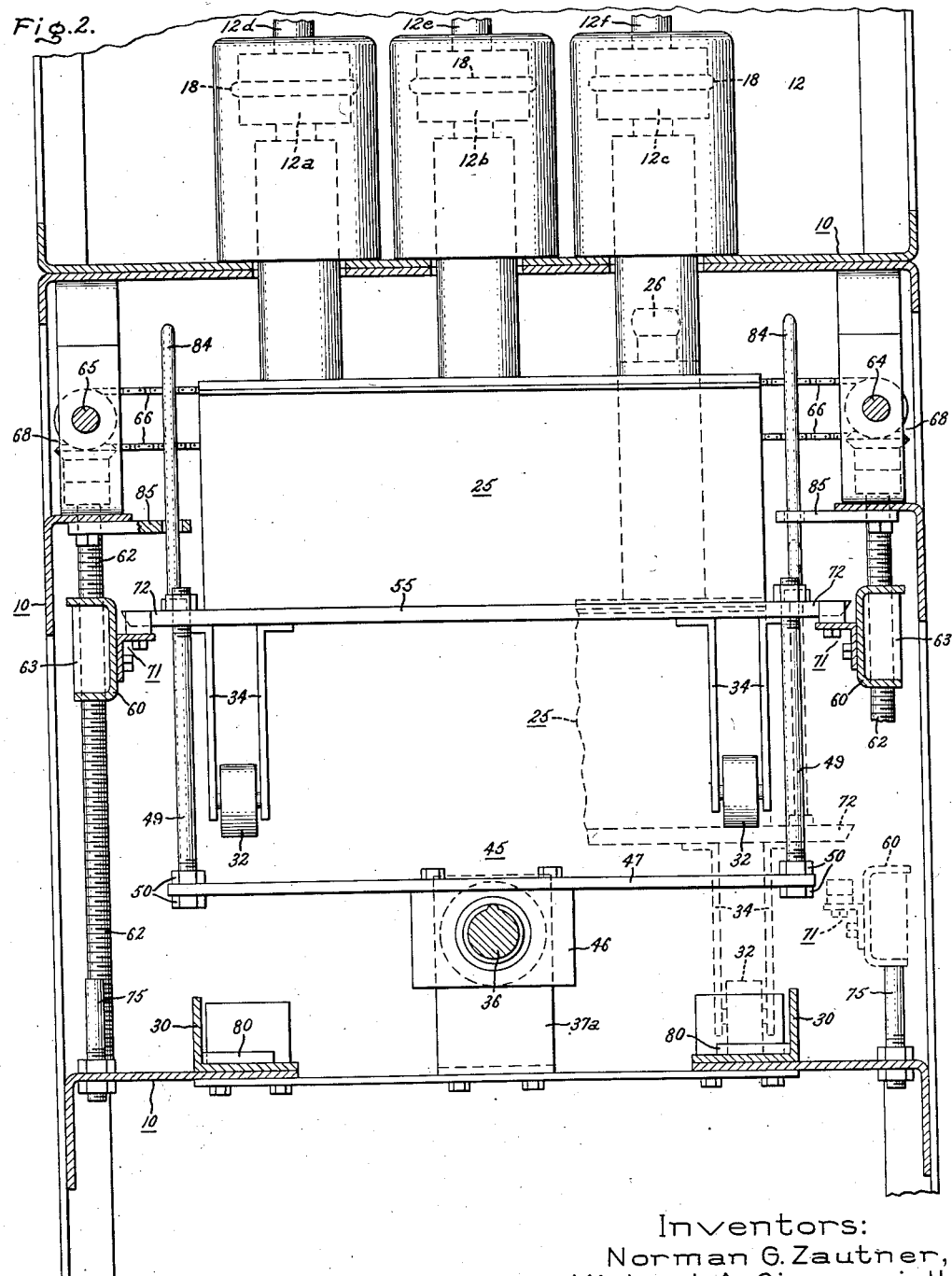

For a better understanding of our invention, reference may be had to the following detailed description taken in conjunction with the accompanying drawings in which Fig. 1 is a side elevational view, partly in section, showing electric switchgear apparatus constructed in accordance with our invention; Fig. 2 is a cross sectional view taken along the line 2—2 of Fig. 1; and Fig. 3 is a diagrammatic representation of an electrical interlock arrangement used in the switchgear apparatus of Figs. 1 and 2.

Referring more particularly to the drawings, the switchgear apparatus shown is of the metal-clad type and comprises a stationary framework 10, the upper portion of which is divided into a plurality of horizontally-spaced compartments 11, 12, 13, 14, 15 and 16. Within each of these compartments, there is provided a set of stationary disconnect contacts which serve as terminals for power circuits of any desired character. These stationary disconnect contacts may be of any conventional form, such as for example, the tulip-type disconnect contact wherein a plurality of contact fingers are urged radially inwardly by a suitable garter spring, such as indicated at 18.

In the illustrated form of our invention, three such stationary disconnect contacts are provided in each compartment, and each of these contacts is connected to a suitable bus which forms one phase of a three-phase circuit. For example, referring to Fig. 2, the compartment 12 contains three disconnect contacts 12a, 12b, and 12c which are respectively connected to buses 12d, 12e, and 12f of a three-phase circuit. By electrically connecting the terminals, or disconnect contacts, within the compartment 12 with corresponding terminals within the adjacent compartment 11, a first power circuit of a predetermined character can be established. Alternatively, by electrically connecting the terminals within compartment 12 with corresponding terminals within compartment 13, a second and different power circuit can be established. Additional power circuits can be established by interconnecting the buses of compartment 15 with those of compartment 14 or, alternatively, with those of compartment 16. Obviously, the number of such alternative circuits can be increased by providing additional buses and terminals, and it is to be understood that the number of buses and terminals shown is simply illustrative of one form of the invention.

For selectively interconnecting any pair of the above sets of stationary disconnect contacts, we provide a metal-enclosed switchgear unit, or circuit breaker, 25 which has upstanding contacts 26 and 27 which are arranged to vertically align and mate with selected sets of stationary disconnect contacts. For example, in the solid line position of Fig. 1, we have shown the contacts 26 and 27 of the switchgear unit vertically-aligned and mating with the stationary contacts in compartments 12 and 13, respectively. It is to be understood that these upstanding contacts 26 and 27 of switchgear unit 25 may be of any conventional form for suitably cooperating with the stationary disconnect contacts. The dotted lines of Fig. 1 show the switchgear unit 25 disposed with its contacts in alignment with a different set of stationary disconnect contacts, i. e., the stationary contacts of compartments 14 and 15. In this dotted line position the switchgear unit is shown in its lowered position wherein its contacts 26, 27 are out of engagement with the stationary disconnect contacts.

It is to be understood that the switchgear unit 25 may be of any conventional form for controlling the circuit which extends between its disconnect contacts 26, 27. Control power for operating the switchgear unit may be supplied to the unit through suitable secondary disconnect contacts (not shown) provided in each of the plugged-in, or elevated, positions of the switchgear unit.

In some cases it is required that the switchgear unit serve merely as a disconnect switch for interconnecting and disconnecting selected sets of terminals. In such cases, it is unnecessary that the switchgear unit be capable of interrupting an energized circuit. For such applications, a continuous circuit is provided from terminals 26 to 27 of the switchgear unit. The term "switchgear unit," as used in this application, is intended to include this type of device as well as one which is capable of interrupting an energized circuit.

For mounting the switchgear unit 25 so that it may be shifted between selected positions of cooperation with the stationary disconnect contacts, we provide a pair of angle irons 30 which serve as horizontally-spaced tracks or rails which extend between the stationary disconnect contacts. The switchgear unit is provided with wheels 32 which align with these rails and support the switchgear unit for horizontal movement therealong. Each of these wheels 32 is rotatably mounted upon the switchgear unit 25 by means of a suitable downwardly extending bracket structure 34.

For propelling the switchgear unit horizontally along these tracks 30, we provide an elongated lead screw 36 which is disposed between the tracks and extends in spaced-apart, parallel relationship with respect thereto. The lead screw 36 is rotatably mounted at its opposite ends by suitable stationary bearing structures 37 and 37a, which also prevent axial movement of the screw 36. One end of the screw projects outwardly beyond the bearing 37 and is provided with a sprocket 38 pinned thereto. Rotation of this sprocket 38 together with lead screw 36 is effected by means of a suitable chain drive 40 which comprises a driving sprocket pinned to a spaced shaft 41. This shaft 41 is suitably journaled in the framework 10 and has a manually-operable crank 42 pinned thereto. Rotation of this crank 42 will, of course, rotate the lead screw 36.

Mounted on the lead screw 36, there is provided a carriage 45 comprising an internally threaded nut portion 46 which meshes with the thread of the lead screw 36. Secured atop this nut portion 46 is a horizontally extending plate 47 having vertically extending guide rods 49 projecting therefrom at each of its corners. These guide rods 49 are suitably secured to the plate 47, as by locking nuts 50.

For coupling the switchgear unit 25 to carriage 45, the switchgear unit is provided with a horizontally extending base plate 55 which is formed with suitable guide apertures for slidably receiving the guide rods 49. These apertures are of such a size that significant movement of the switchgear unit with respect to the carriage is permitted only in a vertical direction. Relative horizontal movement between these two components is essentially precluded. Thus, it will be apparent that when the switchgear unit 25 is in its lowered position, i. e., with the wheels 32 resting upon the rails 30, it may be horizontally shifted along the rails simply by rotating the lead screw 36 and driving the carriage horizontally.

When the switchgear unit is positioned with its contacts 26 and 27 in vertical alignment with a selected group of stationary disconnect contacts, the unit may then be lifted vertically to move the contacts 26, 27 into mating relationship with the selected group of stationary disconnect contacts. This vertical lifting action is performed by means of a pair of spaced-apart lifting brackets or beams 60 which extend horizontally between the stationary disconnect contacts. These brackets 60 are adjustably mounted for vertical movement on the framework 10 and are precluded from horizontal movement with respect to the framework 10 by means of jack screws such as 62 which are threaded into internally threaded nuts 63 secured to the brackets. Preferably, one of these jack screws is provided at each end of each of the lifting brackets. Each of these jack screws is mounted for rotation with respect to the framework but is suitably precluded from axial movement with respect to the framework. These jack screws are all coupled together for simultaneous rotation by means including a pair of horizontally-extending operating shafts 64 and 65 journaled at opposite sides of the framework 10. These operating shafts are coupled together by a suitable chain drive 66 extending across the rear of the framework 10. Suitable bevel gear connections 68 are provided at the top of each jack screw for operatively connecting it to its corresponding operating shaft. The operating shafts and the jack screws are arranged to be driven by means of a suitable electric motor 69 acting through a conventional series of reduction gears 70.

Thus, it will be apparent that energization of the electric motor will simultaneously rotate the jack screws 62 and drive the brackets 60 vertically upwardly or downwardly depending upon the direction of motor rotation. Each of the brackets 60 comprises a laterally-inwardly projecting assembly 71 which is adapted to receive suitable lugs 72 projecting laterally outward from the base plate 55 of the switchgear unit 25. Thus, when the brackets 60 are moved upwardly from the dotted line position of the drawings the bracket assemblies 71 engage the lugs 72 and lift the switchgear unit into contact-mating relationship with the preselected group of stationary disconnect contacts. Preferably, the bracket assemblies 71 are provided with convergent inclined surfaces 73 which act to locate, or center, the switchgear unit in a predetermined fixed location with respect to the lifting brackets 60 during elevation of the switchgear unit. Suitable stops 75 and 76 are provided for positively preventing vertical movement of the brackets 60 beyond predetermined vertical limits.

For insuring that the contacts 26, 27, of the switchgear unit are located in vertical alignment with a selected group of stationary disconnect contacts before lifting action is initiated and also for providing the attendant with an indication of this condition, a series of wedge-shaped positioning blocks 80 are provided on the rails 30. In accordance with our invention, these positioning blocks 80 are arranged in pairs, and the blocks of each pair are spaced apart by an amount sufficient to form a depression which snugly receives a substantial portion of a wheel 32 of the switchgear unit. This relationship is best shown by the dotted lines of Fig. 1. The blocks 80 are so located that when a wheel 32 is positioned within one of the depressions, the contacts of the switchgear unit are in vertical alignment with a group of stationary disconnect contacts. Thus, when a wheel 32 falls into the proper depression, lifting action may then be initiated with the assurance that the contacts 26, 27, of the switchgear unit will be driven into mating relationship with the selected group of stationary contacts. The operator is provided with a definite indication of the required vertically aligned condition by reason of the fact that when he rotates the handle 42 to propel the switchgear unit horizontally along the rails 30, an abrupt increase in resistance to motion is encountered at the instant one of the wheels drops into a depression between a pair of positioning blocks 80. The wheels of the switchgear unit roll freely along the rails until this particular instant, but once the wheel drops into the depression, additional horizontal motion can be produced only by an appreciably greater force being applied to handle 42. The depressions function in this same manner irrespective of the horizontal direction in which the switchgear unit is being moved.

Since the positioning blocks 80 depend for their proper operation upon the ability of the wheels 32 to move vertically up and down, it will be apparent that these positioning blocks are especially well-suited for cooperating with our switchgear unit 25, which is freely movable in a vertical direction about the guide rods 49.

Because these blocks 80 are capable of precisely positioning the switchgear unit in the desired locations, it will be apparent that there is little need for precision in the mating relationship provided between the lead screw 36 and the nut 46 of the carriage 45. Accordingly, we are able to use a lead screw 36 of a very inexpensive construction rather than the usual type of expensive precision screw. For example, we use a screw in which the thread is formed by helically winding a wire 82 about a shaft and welding it thereto.

Although the positioning blocks 80 are capable of providing an indication of when the contacts 26, 27 of the switchgear unit are aligned with a set of the stationary contacts, these blocks do not provide any indication of which particular set of stationary contacts is so aligned. This indication is provided by attaching an indicating disk (not shown) to the shaft 41 of the handle 42. This disk is provided with suitable indicia cooperating with a stationary pointer to indicate the horizontal position of the switchgear unit with respect to the stationary contacts.

Our apparatus is provided with still another means which insures accurate vertical alignment of the contacts of the switchgear unit with the selected set of stationary contacts. This means comprises a pair of vertically-extending interference rods 84 which are fixed to the base plate 55. Cooperating with these interference rods 84 is a pair of elongated plates 85 extending parallel to rails 30 and attached to the sides of framework 10. These plates have appropriately spaced holes therein which are positioned to receive the interference rods 84 only when the contacts 26, 27, are in an aligned condition with respect to a set of stationary disconnect contacts. If the contacts are not so aligned, the interference rods 84 abut against the plates 85 and preclude further lifting action of the switchgear unit.

To preclude the possibility that the lifting motor 69 will be energized at a time when the switchgear unit is in a horizontal position wherein its contacts 26, 27 are out of alignment with a set of stationary contacts, we provide an electrical interlock arrangement such as shown diagrammatically in Fig. 3 of the drawing. In this Figure 3 the motor 69 is shown as being of a conventional split-field, series type having a raise winding RW in series with the armature A of the motor and a lower winding LW also in series with the armature. Energization of the raise winding RW will cause the motor to drive in a raising or lifting direction, whereas energization of the other winding LW will cause the motor to drive in an opposite or lowering direction. The motor is controllable from a three-position, manually-operable switch having a contact arm 88 which is selectively movable from an off position O to energize either a raise terminal R or a lower terminal L of the switch. Movement of the contact arm 88 into the position L will energize the winding LW and cause the motor to drive in a lowering direction, whereas movement of the contact arm into the position R will energize the winding RW to drive the motor in a raising direction, providing in the latter case however, that the switchgear unit is correctly positioned horizontally. The interlock arrangement which senses and responds to the horizontal position of the switchgear unit comprises a plurality of parallel-connected, biased-open switches 90, one for each set of positioning blocks 80 on the rail 30. The switches 90 remain open until depressed by a wheel 32 of the switchgear unit. If the wheel 32 is not positioned within a depression between a set of blocks 80, then the switches 90 are all open. Under such circumstances, since the switches 90 are in series with the raise winding RW, the energizing circuit for causing the motor 69 to drive in a raising direction is disabled. Thus, if the operator moves the motor-controlling contact arm 88 to the position R when the switchgear unit is not correctly positioned horizontally, the motor 69 will remain deenergized because of the open disabling switches 90. Only when the switchgear unit is correctly positioned, i. e., with a wheel 32 in a depression, is a switch 90 closed, and only when a switch 90 is closed, is it possible to energize the raise winding RW of motor 69 by operation of the contact arm 88. A suitable seal-in relay 92 is provided for maintaining the energizing circuit for winding RW intact after the switchgear unit has been lifted off of the rails 30. This seal-in relay 91 has contacts in parallel with each of the switches 90 and a coil in series with the switches. Thus, once the raising circuit is energized, the contacts of the seal-in relay are closed and the raising circuit is unaffected by opening of a previously-closed switch 90.

Suitable limit switches (not shown) are provided for opening the motor energizing circuit if the lifting brackets are driven beyond predetermined vertical limits.

While we have illustrated and described a particular embodiment of our invention, we do not wish to be limited thereto and intend in the appended claims to cover all such changes and modifications as fall within the true spirit and scope of our invention.

What we claim as new and desired to secure by Letters Patent of the United States is:

1. Switchgear apparatus comprising a stationary framework, a plurality of sets of stationary contacts mounted thereon at horizontally spaced locations, a movable switchgear unit having a set of contacts for selectively mating with any one set of said stationary contacts, motive means including a horizontally-extending rotatable lead screw operable to translate said switchgear unit into any one of said plurality of locations, a pair of spaced lifting brackets horizontally-immovable with respect to said framework and extending generally horizontally between said locations, means adjustably mounting said brackets for vertical movement on said framework and operable to simultaneously elevate said brackets, and structure on said switchgear unit engageable by said brackets during elevation thereof for lifting said switchgear unit into contact-mating relationship with a selected set of said stationary contacts.

2. Switchgear apparatus comprising a stationary framework, a plurality of sets of stationary contacts mounted thereon at horizontally-spaced locations, a pair of spaced-apart stationary rails extending generally horizontally between said locations, a switchgear unit having a set of contacts for selectively mating with any one set of said stationary contacts, a horizontally movable carriage, guide means coupling said carriage to said switchgear unit and permitting relative motion therebetween only in a vertical direction, a set of wheels supporting said switchgear unit on said rails independently of said carriage, a rotatable lead screw coupled to said carriage and operable to move said carriage and said switchgear unit horizontally into any one of said plurality of locations, and means for lifting said switchgear unit vertically off of its rails and into contact-mating relationship with a selected set of said stationary contacts.

3. The switchgear apparatus of claim 2 in which said switchgear unit lifting means comprises a pair of lifting brackets horizontally-immovable with respect to said framework and extending generally parallel to said rails, and means adjustably mounting said brackets for vertical movement on said framework and operable to simultaneously elevate said brackets into lifting relationship with said switchgear unit.

4. Switchgear apparatus comprising a stationary framework, a plurality of horizontally-spaced sets of stationary contacts mounted on said framework, a movable switchgear unit having a set of contacts for selectively mating with any one set of said stationary contacts, motive means for translating said switchgear unit into any one of a plurality of horizontally-spaced positions wherein its contacts are in vertical alignment with a set of said stationary contacts, a pair of spaced lifting brackets horizontally-immovable with respect to said framework and extending generally horizontally between said positions, means adjustably mounting said lifting brackets for vertical movement on said framework and operable to raise and lower said brackets, and means engageable by said brackets for transmitting upward movement of said brackets to said switchgear unit whereby to drive said movable contacts upwardly into engagement with a selected set of said stationary contacts.

5. The apparatus of claim 4 in combination with means for abruptly increasing the resistance to horizontal motion of said switchgear unit when it enters each of said horizontally-spaced positions whereby to provide an indication of when lifting action may be initiated.

6. Switchgear apparatus comprising a stationary framework, a plurality of sets of stationary contacts mounted thereon at horizontally-spaced locations, a movable switchgear unit having a set of contacts for selectively mating with any one set of said stationary contacts, motive means for horizontally translating said unit into any one of said plurality of locations, a pair of spaced lifting brackets mounted on said framework and extending generally horizontally between said locations, said lifting brackets being horizontally-immovable with respect to said framework, means for simultaneously elevating said brackets, and structure on said switchgear unit engageable by said brackets during elevation thereof for lifting said switchgear unit into contact-mating relationship with a selected set of said stationary contacts.

7. The apparatus of claim 6 in which said switchgear unit comprises laterally-projecting lugs and said brackets include portions which receive said lugs during lifting of said switchgear unit, the lug-receiving portions of said brackets being provided with inclined convergent faces for precisely locating the switchgear unit relative to the brackets during lifting action.

8. Switchgear apparatus comprising a stationary framework, a plurality of sets of stationary contacts mounted thereon at horizontally-spaced locations, a pair of spaced lifting brackets extending generally horizontally between said locations and horizontally fixed with respect to said framework, a carriage horizontally movable with respect to said brackets, a switchgear unit having a set of contacts for selectively mating with any one set of said stationary contacts, guide means coupling said carriage and said switchgear unit together and permitting relative motion therebetween only in a vertical direction, motive means for horizontally translating said carriage and said switchgear unit into any one of said plurality of locations, means supported on said framework independently of said carriage for simultaneously elevating said brackets, and structure on said switchgear unit engageable by said brackets during elevation thereof for lifting said switchgear unit with respect to said carriage and into contact-mating relationship with a selected set of said stationary contacts.

9. Switchgear apparatus comprising a stationary framework, a plurality of sets of stationary contacts mounted thereon at horizontally-spaced locations, a pair of spaced-apart stationary rails extending generally horizontally between said locations, a horizontally movable carriage restrained against vertical movement, a switchgear unit having a set of contacts for selectively mating with any one set of said stationary contacts, a set of wheels supporting said switchgear unit on said rails independently of said carriage, guide means coupling said carriage and said switchgear unit together and permitting relative movement therebetween only in a vertical direction, motive means for horizontally translating said carriage and said switchgear unit into any one of said plurality of locations, a pair of spaced-apart lifting brackets horizontally immovable with respect to said framework and extending generally horizontally between said locations, means supported on said framework independently of said carriage for adjustably mounting said brackets on said framework and operable to elevate said brackets, and structure on said switchgear unit engageable by said brackets during elevation thereof for lifting said switchgear unit off of said rails and into contact-mating relationship with a selected set of said stationary contacts.

10. Switchgear apparatus comprising a stationary framework, a plurality of sets of stationary contacts mounted thereon at horizontally-spaced locations, a pair of spaced rails extending generally horizontally between said locations, a movable switchgear unit having a set of contacts for selectively mating with any one set of said stationary contacts, a set of wheels mounting said switchgear unit on said rails, motive means for horizontally shifting said unit along said rails, at least one of said rails being provided with means forming a series of spaced depressions each of which is adapted to receive a wheel of said unit, said depressions being so located that when said wheel is received therein the switchgear unit is positioned with its contacts in vertical alignment with a set of said stationary contacts, lifting brackets horizontally immovable with respect to said framework and extending generally parallel to said rails, means adjustably mounting said brackets for vertical movement on said framework and operable to simultaneously elevate said brackets, and structure on said switchgear unit engageable by said brackets during elevation thereof for lifting said switchgear unit into contact-mating relationship with a selected set of said stationary contacts.

11. Switchgear apparatus comprising a stationary framework, a plurality of sets of stationary contacts mounted thereon at horizontally-spaced locations, a pair of spaced rails extending generally horizontally between said locations, a movable switchgear unit having a set of contacts for selectively mating with any one set of said stationary contacts, a set of wheels mounting said switchgear unit on said rails, motive means for horizontally shifting said unit along said rails, at least one of said rails being provided with means forming a series of spaced depressions each of which is adapted to snugly receive a wheel of said unit, said depressions being so located that when said wheel is snugly received therein the switchgear unit is positioned with its contacts in vertical alignment with a set of said stationary contacts, and means for lifting said switchgear unit vertically off of said rails and into contact-mating relationship with a selected set of said stationary contacts.

12. Switchgear apparatus comprising a stationary framework, a plurality of horizontally spaced sets of stationary contacts mounted on said framework, a movable switchgear unit having a set of contacts for selectively mating with any one set of said stationary contacts, means for translating said switchgear unit into any one of a plurality of horizontally-spaced locations wherein its set of contacts vertically aligns with a set of said stationary contacts, elevating means including an electric motor operable to lift said switchgear unit into contact-mating relationship with a selected set of said stationary contacts, a normally-inoperative energizing circuit for controlling the lifting operation of said motor, means operable in response to movement of the switchgear unit into one of said locations for rendering said energizing circuit operative whereby to permit energization of said motor over said circuit when the switchgear unit is positioned in said location, and selectively-operable means for effecting said energization.

13. Switchgear apparatus comprising a stationary framework, a plurality of horizontally spaced sets of stationary contacts mounted on said framework, a movable switchgear unit having a set of contacts for selectively mating with any one set of said stationary contacts, means for translating said switchgear unit into any one of a plurality of horizontally-spaced locations wherein its set of contacts vertically aligns with a set of said stationary contacts, elevating means including an electric motor operable to lift said switchgear unit into contact-mating relationship with a selected set of said stationary contacts, an energizing circuit for controlling the lifting operation of said motor, interlock switch means disabling said circuit when said switchgear unit is positioned outside of any of said locations, and means for rendering said interlock switch means incapable of disabling said circuit in response to movement of said switchgear unit into one of said locations, whereby to then permit energization of said motor over said circuit.

References Cited in the file of this patent

UNITED STATES PATENTS

| | | |
|---|---|---|
| 1,798,705 | Rugg | Mar. 31, 1931 |
| 1,928,420 | Graves | Sept. 26, 1933 |
| 1,929,293 | Germain | Oct. 3, 1933 |
| 2,610,275 | Butterfield | Sept. 9, 1952 |